(12) United States Patent
Chung

(10) Patent No.: US 9,331,467 B2
(45) Date of Patent: May 3, 2016

(54) LIGHTNING PROTECTION AND GROUNDING DEVICE FOR VEHICLE

(71) Applicant: The Korea Development Bank, Seoul (KR)

(72) Inventor: Young-ki Chung, Seoul (KR)

(73) Assignee: THE KOREA DEVELOPMENT BANK (KR)

( * ) Notice: Subject to any disclaimer, the term of this patent is extended or adjusted under 35 U.S.C. 154(b) by 0 days.

(21) Appl. No.: 14/534,996

(22) Filed: Nov. 6, 2014

(65) Prior Publication Data

US 2015/0124365 A1  May 7, 2015

(30) Foreign Application Priority Data

Nov. 7, 2013  (KR) ......................... 10-2013-0134740

(51) Int. Cl.
  *H02H 1/04* (2006.01)
  *H02G 13/00* (2006.01)
  *B60R 16/06* (2006.01)

(52) U.S. Cl.
  CPC ............... *H02G 13/80* (2013.01); *B60R 16/06* (2013.01); *H02G 13/40* (2013.01)

(58) Field of Classification Search
  USPC .................................................. 361/117, 217
  See application file for complete search history.

(56) References Cited

U.S. PATENT DOCUMENTS

| 1,926,697 | A | * | 9/1933 | Murphy | .................... | E06C 5/16 |
| | | | | | | 182/113 |
| 2,402,090 | A | * | 6/1946 | Ruppel | ..................... | E01C 9/10 |
| | | | | | | 404/36 |
| 3,858,690 | A | * | 1/1975 | Facemire | .................. | B60T 3/00 |
| | | | | | | 188/32 |
| 4,321,653 | A | * | 3/1982 | Takahashi | ............... | B60R 16/06 |
| | | | | | | 16/18 R |
| 6,288,327 | B1 | * | 9/2001 | Tobias | ..................... | H01R 4/66 |
| | | | | | | 174/3 |
| 7,465,874 | B2 | * | 12/2008 | Obleman, Jr. | ........... | H01R 4/66 |
| | | | | | | 174/3 |
| 2004/0105211 | A1 | * | 6/2004 | Chung | ................... | H02G 13/00 |
| | | | | | | 361/220 |
| 2012/0113558 | A1 | * | 5/2012 | Browne | ................... | H02H 1/06 |
| | | | | | | 361/117 |
| 2012/0217058 | A1 | * | 8/2012 | Higby | .................... | H02G 11/02 |
| | | | | | | 174/70 R |
| 2013/0228357 | A1 | * | 9/2013 | Mundle | .................... | H01R 4/66 |
| | | | | | | 174/6 |
| 2014/0262410 | A1 | * | 9/2014 | Behr | ....................... | H02G 13/40 |
| | | | | | | 174/3 |
| 2015/0124365 | A1 | * | 5/2015 | Chung | ................... | H02G 13/80 |
| | | | | | | 361/117 |

FOREIGN PATENT DOCUMENTS

| KR | 10-2009-0123127 | 12/2009 |
| KR | 10-0999350 | 12/2010 |
| WO | WO 2012/115721 | 8/2012 |

* cited by examiner

*Primary Examiner* — Ronald W Leja
(74) *Attorney, Agent, or Firm* — David R. Stevens; Stevens Law Group

(57) ABSTRACT

The present invention relates to a lightning protection and grounding device for a vehicle including: a dipole lightning rod mounted on the vehicle to in advance remove the focusing of an electric field of a lightning strike and to induce the discharge of lightning current when the lightning strike is induced thereto; grounding means disposed on earth to allow the lightning current of the lightning strike induced to the dipole lightning rod to flow to the earth, the ground means being formed of a flat plate disposed behind the rear wheels of the vehicle in such a manner as to be fixed compressedly to earth by means of the driving pressure of the rear wheels; and a connection terminal box adapted to connect the dipole lightning rod and the grounding means with each other.

7 Claims, 6 Drawing Sheets

FIG. 4A
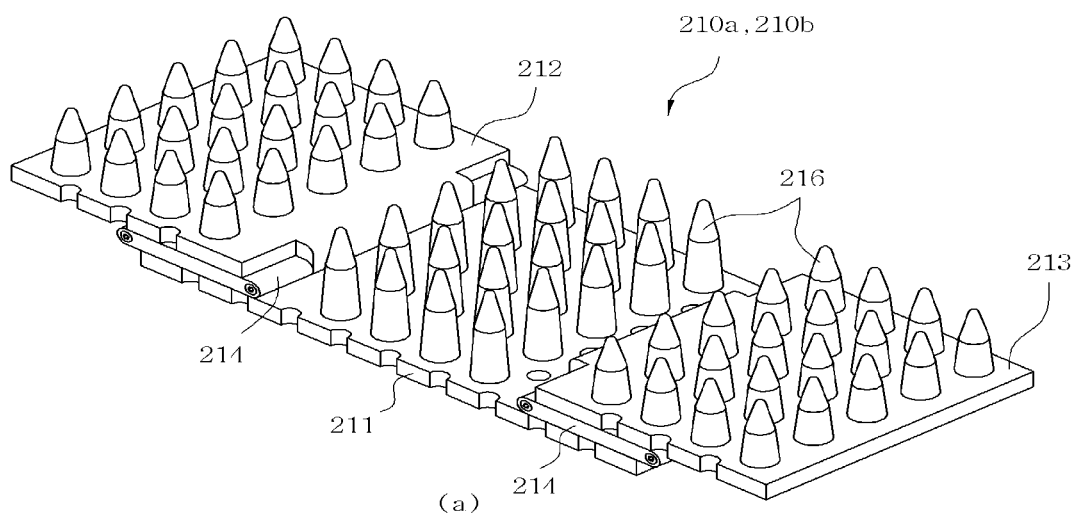
(a)
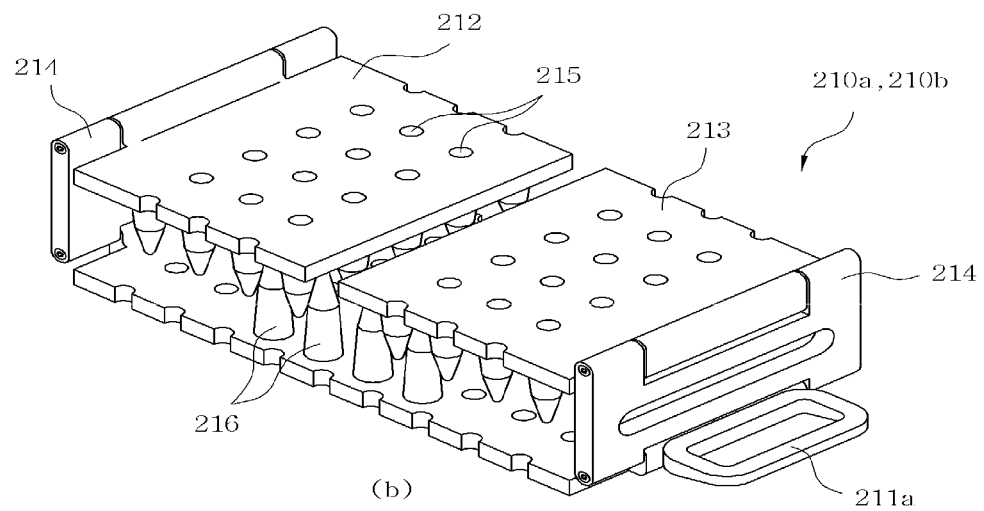
(b)
FIG. 4B

LIGHTNING PROTECTION AND GROUNDING DEVICE FOR VEHICLE

CROSS-REFERENCE TO RELATED APPLICATIONS

This application claims the benefit of Korean Patent Application No. 10-2013-0134740, filed Nov. 7, 2013, the disclosure of which is incorporated herein by reference in its entirety.

BACKGROUND OF THE INVENTION

1. Field of the Invention

The present invention relates to a lightning protection and grounding device for a vehicle, and more particularly, to a lightning protection and grounding device for a vehicle which is capable of protecting the relatively expensive vehicle used for a specific purpose from the damage of lightning.

2. Background of the Related Art

Generally, vehicles used for specific purposes (for example, military use, relay broadcasting, mobile communication mobile base station) have advanced electronic equipment sensitive to electrical impacts.

Such vehicles used for specific purposes are especially weak to a direct lightning strike. That is, if the vehicles are struck by the lightning current of the direct lightning strike, the high-priced advanced electronic equipment sensitive to an over voltage may be operated erroneously or malfunctioned. Besides, economical damage may occur when they are repaired.

Particularly, if the damage of lightning occurs on a military communication vehicle, a radio communication military command system may be collapsed, thus making it hard to be respond to very urgent situations.

Accordingly, the vehicle for a specific purpose has a lightning prevention system capable of substantially reducing the probability of direct lightning strike and grounding high voltage and high frequency lightning current upon the application of the direct lightning strike to earth to prevent the introduction of the lightning current thereinto, thus protecting the communication equipment from the damage of lightning.

By the way, according to the conventional lightning prevention system, a grounding body should be elongatedly extended outward from both sides of a vehicle, thus making it inconvenient to be installed on an area where the width of a road is small, and further, tens of fixing pins should be located to fix the grounding body, thus substantially increasing the number of workers and the working time for installing the fixing pins.

According to the conventional lightning prevention system, further, a dipole lightning rod has a linear structure so that it can be elongatedly extended to a given length, thus being easily broken due to external impacts and providing bad portability and keeping ability.

SUMMARY OF THE INVENTION

Accordingly, the present invention has been made in view of the above-mentioned problems occurring in the prior art, and it is an object of the present invention to provide a lightning protection and grounding device for a vehicle that has a dipole lightning rod formed in an insertion/drawing way and grounding means formed in a foldable assembling way, thus improving carrying, handling and keeping abilities and conducting installing and disassembling work in rapid and convenient ways.

To accomplish the above-mentioned object, according to the present invention, there is provided a lightning protection and grounding device for a vehicle including: a dipole lightning rod mounted on the vehicle to in advance remove the focusing of an electric field of a lightning strike and to induce the discharge of lightning current when the lightning strike is induced thereto; grounding means disposed on earth to allow the lightning current of the lightning strike induced to the dipole lightning rod to flow to the earth, the ground means being formed of a flat plate disposed behind the rear wheels of the vehicle in such a manner as to be fixed compressedly to earth by means of the driving pressure of the rear wheels; and a connection terminal box adapted to connect the dipole lightning rod and the grounding means with each other.

According to the present invention, desirably, the grounding means includes first and second plates each having given thickness and area and a ground wire having one end connected to the connection terminal box and the other end connected to the first and second plates, respectively.

According to the present invention, desirably, each of the first and second plates includes a main plate, a first auxiliary plate connected to one end of the main plate, a second auxiliary plate connected to the other end of the main plate, and hinge plates adapted to allow the first auxiliary plate and the second auxiliary plate to rotate toward the main plate.

According to the present invention, desirably, the main plate has a handle for grasping formed on one end thereof.

According to the present invention, desirably, the first and second plates have a plurality of through holes formed on the surfaces thereof.

According to the present invention, desirably, the grounding means further includes a mounting box mounted on the vehicle to accommodate the first and second plates thereinto.

According to the present invention, desirably, the device further includes a lifting driving unit disposed on the vehicle to move the dipole lightning rod in upward and downward directions.

According to the present invention, desirably, the lifting driving unit includes a housing box having an entrance/exist formed on the upper portion thereof, ladder members accommodated into the housing box in such a manner as to be telescopically extended and contracted, and deviation prevention means adapted to prevent the ladder members adjacently disposed up and down from being deviated from each other.

According to the present invention, desirably, the deviation prevention means includes a fixing body, the locking protrusion having one end coupled to the fixing body and the other end protruding outward, and a spring disposed inside the fixing body to elastically move the locking protrusion.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 4a and 4b are perspective views showing the configuration and operation of the first and second plates of grounding means in FIG. 1;

DETAILED DESCRIPTION OF THE PREFERRED EMBODIMENTS

Figure 1:
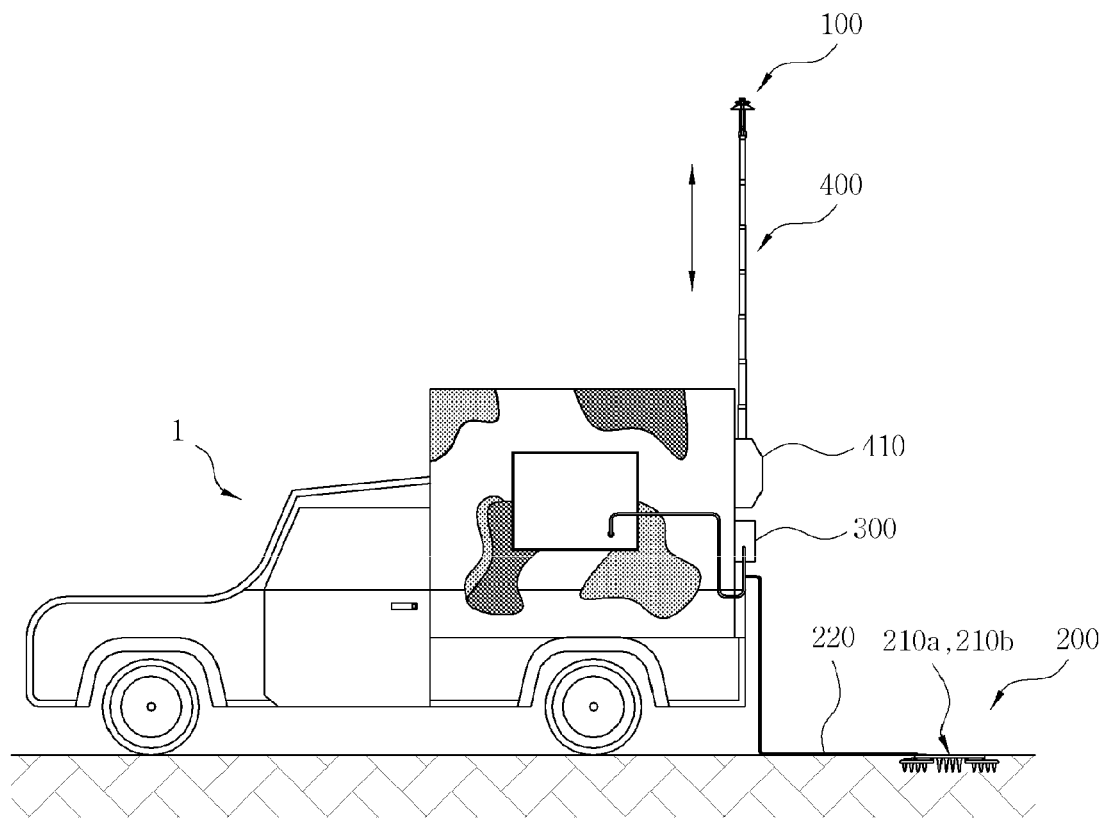
FIG. 1 is a side view showing a lightning protection and grounding device for a vehicle according to the present invention.

Hereinafter, an explanation on a lightning protection and grounding device for a vehicle according to the present invention will be in detail given with reference to the attached drawing.

According to the present invention, a lightning protection and grounding device for a vehicle includes a dipole lightning rod 100 mounted on the vehicle 1 to in advance remove the focusing of an electric field of a lightning strike and to induce the discharge of lightning current when the lightning strike is induced thereto; grounding means 200 disposed on earth to allow the lightning current of the lightning strike induced to the dipole lightning rod 100 to flow to the earth; and a connection terminal box 300 adapted to connect the dipole lightning rod 100 and the grounding means 200 with each other.

First, the detailed explanation on the dipole lightning rod 100 is disclosed in Korean Patent Application No. 2009-0037633 entitled "high performance dipole lightning rod", Korean Patent Application No. 2009-0037634 entitled "high performance dipole lightning rod", Korean Patent Registration No. 0433011 entitled "dipole multi-space charge distribution type lightning protection device", Korean Patent Registration No. 0419977 entitled "dipole space charge discharge distribution type lightning protection device", Korean Patent Registration No. 0460434 entitled "dipole lightning rod", and Korean Patent Registration No. 0787569 entitled "lightning protection device", which are filed by the same applicant as the invention.

The dipole lightning rod 100 is adapted to suppress the occurrence of a lightning strike and at the same time to easily emit the lightning strike to earth if the lightning strike is induced thereto.

The dipole lightning rod 100 has the same or similar configuration as or to the prior art documents as filed by the same applicant as the invention, and therefore, the detailed explanation on the dipole lightning rod 100 will be avoided.

The grounding means 200 is disposed on earth and serves to allow the lightning current of the lightning strike induced to the dipole lightning rod 100 to flow to the earth.

According to the present invention, the grounding means 200 is formed of a flat plate which is disposed behind the rear wheels of the vehicle 1 in such a manner as to be fixed compressedly to the earth by means of the drive pressure of the rear wheels when used.

In more detail, the grounding means 200 includes first and second plates 210a and 210b each having given thickness and area and a ground wire 220 having one end connected to the connection terminal box 300 and the other end connected to the first and second plates 210a and 210b, respectively.

That is, the first and second plates 210a and 210b are formed of the plate having the given area, thus improving the discharge efficiency of the lightning current received from the dipole lightning rod 100 to the earth.

Further, the first and second plates 210a and 210b are simply disposed on the surface of earth behind the rear wheels of the vehicle 1, and unlike the existing grounding body, accordingly, there is no need to extend the grounding means 200 outward from both sides of the vehicle, so that the grounding means 200 can be installed even on an area where the width of a road is relatively small and the grounding means 200 can be easily collected when retired, which makes the invention adequate to a military purpose.

Figure 3:
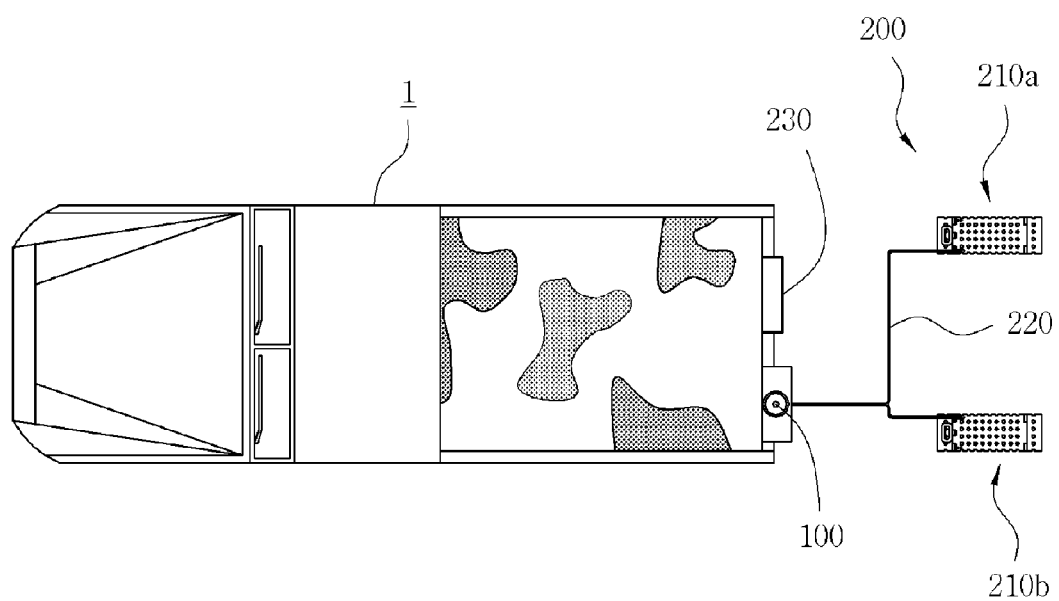
FIG. 3 is a plan view showing the lightning protection and grounding device for a vehicle according to the present invention.

As shown in FIGS. 3 to 4b, each of the first and second plates 210a and 210b is formed of a foldable assembly having a main plate 211, a first auxiliary plate 212 connected to one end of the main plate 211, a second auxiliary plate 213 connected to the other end of the main plate 211, and hinge plates 214 adapted to allow the first auxiliary plate 212 and the second auxiliary plate 213 to rotate toward the main plate 211.

This reduces the whole sizes of the first and second plates 210a and 210b, thus allowing them to be easily loaded and kept into the vehicle and further improving the easiness in delivery for their installation and disassembly.

Further, the main plate 211 has a handle 211a for grasping formed on one end thereof.

Moreover, the first and second plates 210a and 210b have a plurality of through holes 215 formed on the surfaces thereof.

Figure 2:
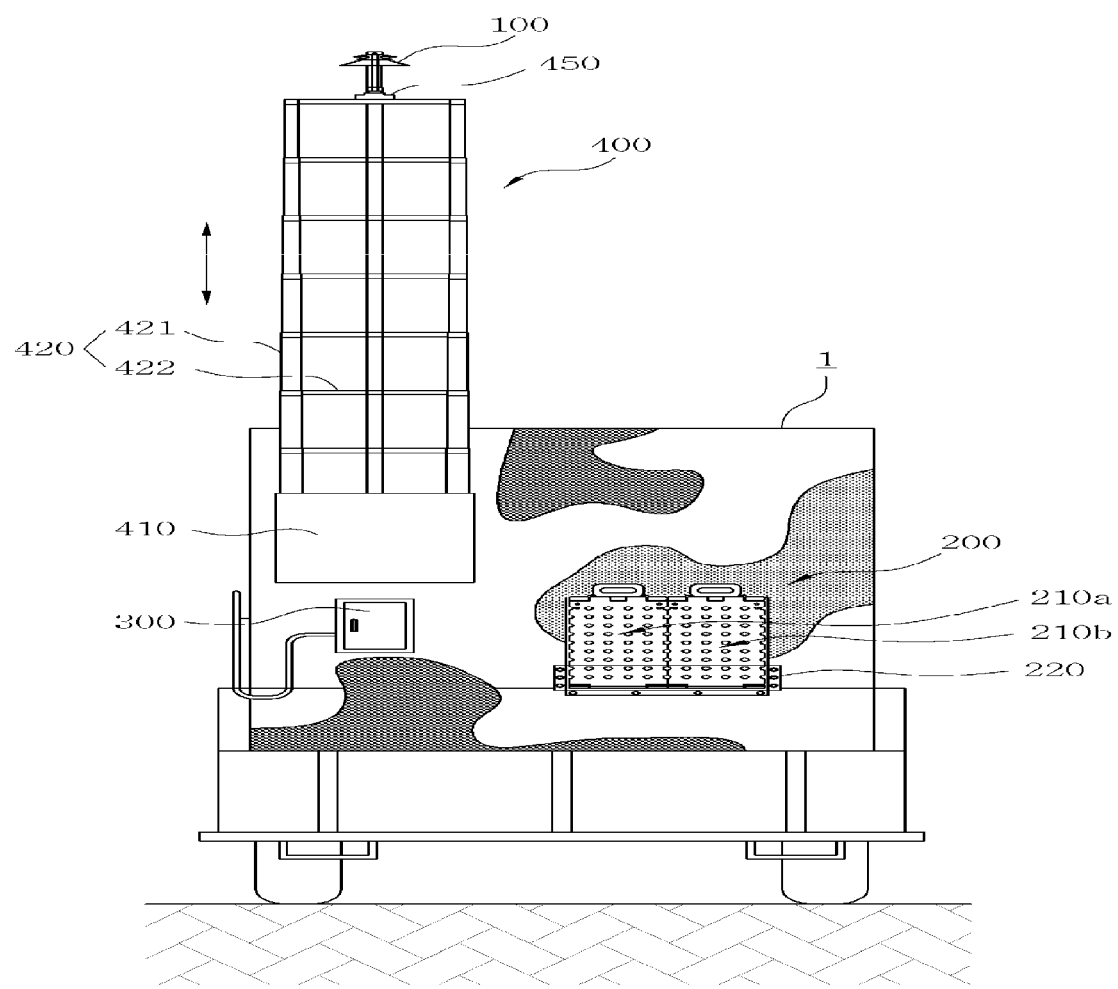
FIG. 2 is a rear view showing the lightning protection and grounding device for a vehicle according to the present invention.

Further, a mounting box 230 is mounted on the vehicle 1 to accommodate the first and second plates 210a and 210b thereinto (See FIGS. 2 and 3).

Furthermore, the first and second plates 210a and 210b have a plurality of fixing pins 216 whose front ends sharply protrude.

That is, the fixing pins 216 serve to improve the grounding efficiency and to rigidly fix the first and second plates 210a and 210b to the earth.

Like this, the grounding means 200 according to the present invention is simply disposed fixedly to the earth by means of the driving force pressurized by the rear wheels of the vehicle 1, without being arranged in a zigzag pattern by a worker.

The lightning protection and grounding device according to the present invention further includes a lifting driving unit 400 adapted to move the dipole lightning rod 100 in up and down directions.

That is, the lifting driving unit 400 is mounted on the vehicle 1 and serves to induce the easy introduction of the lightning current through the adjustment of the height of the dipole lightning rod 100. Further, there is no need to elongate the dipole lightning rod 100, and accordingly, the lifting driving unit 400 serves to prevent the dipole lightning rod 100 from being easily deformed or broken due to external impacts.

In more detail, the lifting driving unit 400 includes a housing box 410 having an entrance/exit formed on the upper portion thereof, ladder members 420 accommodated into the housing box 410 in such a manner as to be telescopically extended and contracted, and deviation prevention means 430 adapted to prevent the ladder members 420 adjacently disposed up and down from being deviated from each other.

Each ladder member 420 includes vertical members 421 spaced apart from each other on one side and the other side thereof and having a hollow guide hole 421a formed therein, a connection member 422 connecting the vertical members 412 with each other, and a locking hole 421b formed on the lower portion of one side vertical member 421 to insert and draw a locking protrusion 432 of the deviation prevention means 430 thereinto and therefrom.

The deviation prevention means 430 includes a fixing body 431 disposed on the upper portion of the inner side of the guide hole 421a of the vertical members 421, the locking protrusion 432 having one end coupled to the fixing body 431 and the other end protruding outward, and a spring 433 disposed inside the fixing body 431 to elastically move the locking protrusion 432.

The vertical members 421 of the ladder members 420 adjacently disposed up and down become increased or decreased in diameter from the bottom to the top.

That is, if the ladder member 420 at the uppermost position of the telescopically arranged ladder members 420 is lifted upward, the deviation prevention means 430 mounted on the lifting ladder members 420 operates repeatedly to restrain next ladder member, thus extending the ladder members 420.

Contrarily, if a pressure is applied from top to bottom by a worker so as to contract the ladder members 420 extended, the pressure is transmitted to the locking protrusion 432 of the deviation prevention means 430, and the locking protrusion 432 elastically moves to release the locking restraint. Accordingly, the ladder members 420 are sequentially telescopically arranged and returned to their original state.

Figure 5:
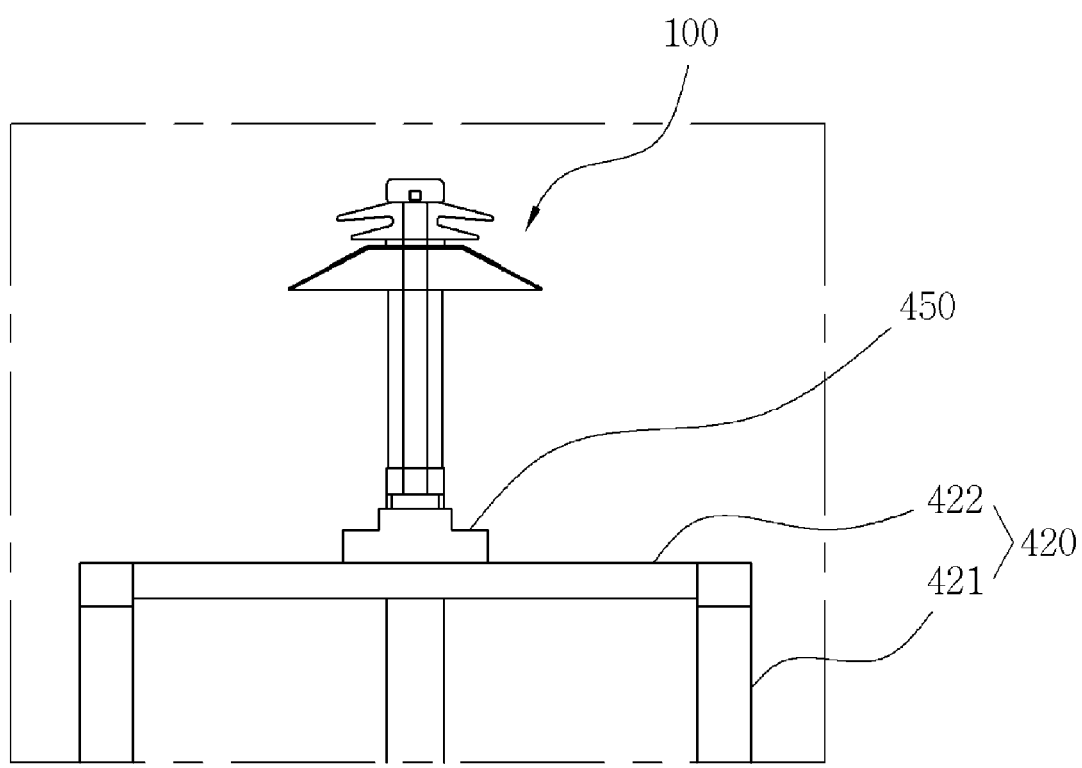
FIG. 5 is an enlarged view showing a fixing member mounted on a lifting driving unit of FIG. 2.
Figure 6:
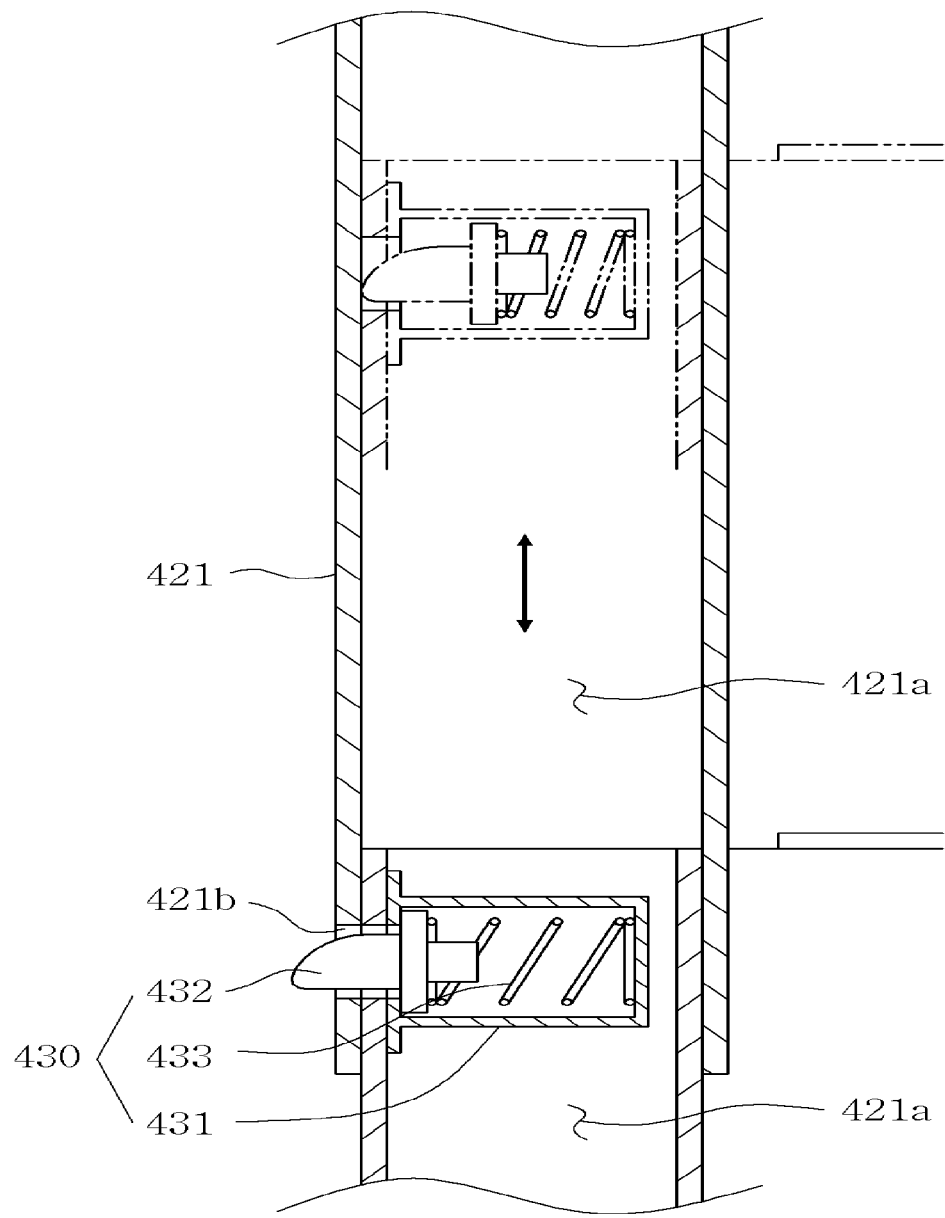
FIG. 6 is a sectional view showing the configuration and operation of deviation preventing means mounted on a ladder member in FIG. 1.

Further, a fixing member 450 is disposed on the uppermost ladder members 420 to couple the dipole lightning rod 100 thereto (See FIG. 5).

The fixing member 450 serves to rigidly fix the dipole lightning rod 100 thereto, thus minimizing the shaking of the dipole lightning rod 100.

As mentioned above, the lightning prevention and grounding device for the vehicle according to the present invention includes the lifting driving unit 400 capable of lifting the dipole lightning rod 100 in upward and downward directions, so that the introduction of the lightning current can be easily induced through the adjustment of the height of the dipole lightning rod 100, and since there is no need to elongate the dipole lightning rod 100, the dipole lightning rod 100 can be prevented from being easily deformed or broken due to external impacts.

Further, the ground means 200 is formed of the flat plate disposed behind the rear wheels of the vehicle 1 in such a manner as to be fixed compressedly to the earth by means of the driving pressure of the rear wheels when used, so that the grounding means 200 can be installed and disassembled in rapid and convenient ways and installed even on an area where the width of a road is relatively small and can be folded, thus making it easy to be handled, kept, and delivered.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A lightning prevention and grounding device for a vehicle, comprising:
    a dipole lightning rod mounted on the vehicle to in advance remove the focusing of an electric field of a lightning strike and to induce the discharge of lightning current when the lightning strike is induced thereto;
    grounding means disposed on earth to allow the lightning current of the lightning strike induced to the dipole lightning rod to flow to the earth, the ground means being formed of at least one flat plate disposed behind the rear wheels of the vehicle in such a manner as to be fixed compressedly to earth by means of the driving pressure of the rear wheels; and
    a connection terminal box adapted to connect the dipole lightning rod and the grounding means with each other;
    wherein the at least one flat plate comprises:
        first and second plates each having given thickness and area; and
        a ground wire having one end connected to the connection terminal box and the other end connected to the first and second plates, respectively;
    wherein each of the first and second plates comprises:
        a main plate;
        a first auxiliary plate connected to one end of the main plate;
        a second auxiliary plate connected to the other end of the main plate; and
        hinge plates adapted to allow the first auxiliary plate and the second auxiliary plate to rotate toward the main plate.

2. The lightning prevention and grounding device according to claim 1, wherein the main plate has a handle for grasping formed on one end thereof.

3. The lightning prevention and grounding device according to claim 1, wherein the first and second plates have a plurality of through holes formed on the surfaces thereof.

4. The lightning prevention and grounding device according to claim 1, wherein the grounding means further comprises a mounting box mounted on the vehicle to accommodate the first and second plates thereinto.

5. The lightning prevention and grounding device according to claim 1, further comprising a lifting driving unit mounted on the vehicle to move the dipole lightning rod in upward and downward directions.

6. The lightning prevention and grounding device according to claim 5, wherein the lifting driving unit comprises:
    a housing box having an entrance/exist formed on the upper portion thereof;
    ladder members accommodated into the housing box in such a manner as to be telescopically extended and contracted; and
    deviation prevention means adapted to prevent the ladder members adjacently disposed up and down from being deviated from each other.

7. The lightning prevention and grounding device according to claim 6, wherein the deviation prevention means comprises:
    a fixing body;
    a locking protrusion having one end coupled to the fixing body and the other end protruding outward; and
    a spring disposed inside the fixing body to elastically move the locking protrusion.

* * * * *